United States Patent [19]

Krauss

[11] Patent Number: 5,253,281
[45] Date of Patent: Oct. 12, 1993

[54] X-RAY DIAGNOSTICS INSTALLATION FOR SUBTRACTION ANGIOGRAPHY

[75] Inventor: Peter Krauss, Bubenreuth, Fed. Rep. of Germany

[73] Assignee: Siemens Aktiengesellschaft, Munich, Fed. Rep. of Germany

[21] Appl. No.: 737,474

[22] Filed: Jul. 30, 1991

[51] Int. Cl.$^5$ ............................................. H05G 1/64
[52] U.S. Cl. ....................................... 378/99; 378/98; 358/111
[58] Field of Search .................... 378/99, 98; 358/111; 364/413.23, 413.24

[56] References Cited

U.S. PATENT DOCUMENTS

| | | | |
|---|---|---|---|
| 4,473,843 | 9/1984 | Bishop et al. | 378/99 |
| 4,709,385 | 11/1987 | Pfeiler et al. | 358/111 |
| 4,816,681 | 3/1989 | Shimura | 378/99 |
| 4,827,492 | 5/1989 | Klauzs | 378/99 |
| 4,833,625 | 5/1989 | Fisher et al. | 358/111 |
| 5,058,176 | 10/1991 | Shimazaki et al. | 378/99 |

Primary Examiner—David P. Porta
Assistant Examiner—Don Wong
Attorney, Agent, or Firm—Hill, Steadman & Simpson

[57] ABSTRACT

An x-ray diagnostics installation for subtraction angiography has an x-ray radiator which generates an x-ray beam that penetrates a patient, the resulting image being processed in an x-ray image intensifier video chain wherein the x-ray image is converted into a sequence of video signals for display. The video chain includes an image memory for storing the video signals and a difference-forming unit for subtracting the stored video signals from current video signals to form difference video signals. An image reproduction stage has various adjustment elements permitting variation of parameters identifying a region or a window of brightness values for reproducing the video signals on the display. By means of the adjustment elements, various image parameters, such as background brightness and darkening of the blood vessels, can be set independently of each other.

6 Claims, 2 Drawing Sheets

X-RAY DIAGNOSTICS INSTALLATION FOR SUBTRACTION ANGIOGRAPHY

BACKGROUND OF THE INVENTION

1. Field of the Invention

The present invention is directed to an x-ray diagnostics installation, and in particular to such an installation suitable for subtraction angiography.

2. Description of the Prior Art

X-ray systems used in subtraction angiography generally include an x-ray radiator which generates an x-ray beam that penetrates a patient, with the resulting x-ray image being processed in an x-ray image intensifier video chain, wherein the x-ray image is converted into a sequence of video signals. The video chain includes an image memory in which video signals are stored, and a subtraction unit wherein the stored video signals are subtracted from current incoming video signals so that a difference video signal is formed. A playback or reproduction system is provided for displaying the difference video signals, which includes controls for varying parameters which identify a region or a window of brightness values in the display of the difference video signals on a monitor.

Such installations are employed in digital subtraction angiography (DSA) which enables a radiological portrayal of blood vessels without the superimposition of bones, air and soft tissue thereon. A contrast agent is for this purpose injected in a blood vessel at the beginning of an exposure series. A "dummy" exposure is made for use as a mask, before the contrast agent appears in the vessels of the region under examination. The stored dummy image is subtracted from the "filled" image in a filling phase following immediately thereafter, wherein the concentration of the contrast agent in the vessels gradually increases, the concentration rising to a maximum and then decaying. Only image structures containing the contrast agent are obtained. The difference image displayed on the monitor usually has a low contrast. For this reason, it is intensified or "windowed."

A gray scale region-of-interest of the difference image can be displayed over the full brightness range of the image monitor as a result of the windowing. Gray scale values of the difference image which lie outside the window are shown only as black or white on the image monitor.

An apparatus for windowing is disclosed in U.S. Pat. No. 4,827,492, wherein two operating elements are provided for setting the window. The window width is set with one operating element and the window center and the upper or lower window boundary are set with the other operating element. A disadvantage of this known apparatus is that the background brightness of the subtraction image and the darkening (optical density) of the blood vessels cannot be set independently of each other. The user is therefore forced to undertake an optimization of the image in alternation using both operating elements. Reproducible image results, however, can be achieved only with difficulty in this way. The maintenance of reproducible image results is required, for example, for a hard copy documentation which must be kept constant in quality, such as on a film.

SUMMARY OF THE INVENTION

It is an object of the present invention to provide an x-ray diagnostics installation suitable for subtraction angiography wherein image parameters can be set independently of each other for windowing, with a plurality of adjustment elements.

The above object is achieved in accordance with the principles of the present invention in an x-ray diagnostics installation wherein the image reproduction circuitry in the video chain is provided with a plurality of adjustment elements, which respectively control various image parameters, so that the parameters can be set independently of each other by separate adjustment elements. Thus, one parameter can be set to a desired value without influencing another parameter.

It is of particular importance for the documentation of examination results with a hard copy that the background brightness and the darkening of the vessels be set independently of each other as image parameters. To obtain a reproducible, good exposure on a film, this means that, for example, the background brightness, (i.e. the gray scale value of the monitor for a digital "zero" after the subtraction) can be varied by one of the adjustment elements independently of the darkening of the blood vessels. The darkening of the blood vessels can be set with another operating element without changing the background brightness in order, for example, to take the dependency of the amount of contrast agent in the blood into consideration. The desired background brightness in the system thus has to be set only once. An adaptation dependent on, for example, the body region under examination is not necessary.

It is advantageous if the devices which are used for playback include a signal converter which converts the difference video signals in accordance with the parameters set by the adjustment elements. The signal converter can convert the digital values of the difference video signal which has been supplied to the converter as input values, into output values having a straight line characteristic within a region of interest. The signal converter may be a look-up table (LUT). The independent adjustment can be undertaken by using a first adjustment element to effect a parallel shift of the characteristic, and using a second adjustment element to effect a rotation of the characteristic line around a point which is the intersection of the characteristic line with a line perpendicular to a value of the difference video signals which represents an image signal difference of zero, i.e., the window middle.

DESCRIPTION OF THE PREFERRED EMBODIMENTS

Figure 1:
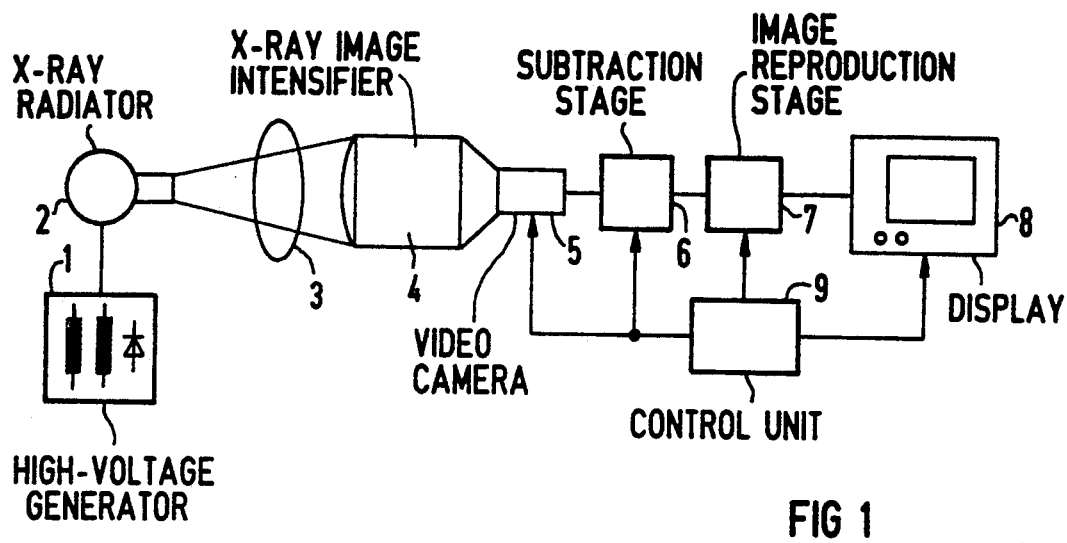
FIG. 1 is a schematic block diagram of an x-ray diagnostics installation of the type known in the art.

The basic components of a typical, known x-ray diagnostics installation are shown in FIG. 1. This system includes an x-ray tube 2 driven by a high-voltage generator 1. The x-ray tube 2 generates an x-ray beam which penetrates an examination subject 3. As a result of the different absorption characteristics of the tissue and bones of the patient 3, a radiation image is produced on the input luminescent screen of an x-ray image intensifier 4. An intensity-amplified, visible image is present at the output luminescent screen of the x-ray image intensifier 4. This image is acquired by a video camera 5 and is converted into video signals. The video signals are supplied to a subtraction stage 6, connected to an image reproduction (playback) stage 7. The image reproduction stage 7, for example, "windows" the difference video signals supplied by the subtraction stage 6. The output signals of the image reproduction stage 7 are displayed on a display 8. A control unit 9 generates clock signals for synchronizing the operation of all of the components in the video chain.

Figure 2:
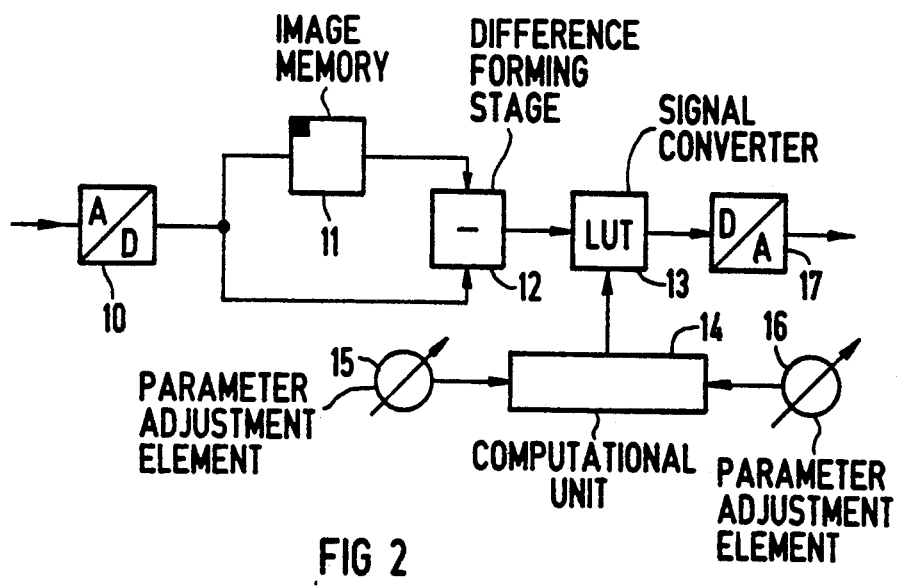
FIG. 2 is a schematic block diagram of the subtraction and image reproduction circuits in an x-ray diagnostics installation constructed in accordance with the principles of the present invention.

Details of a subtraction stage 6 and an image reproduction stage 7 constructed in accordance with the principles of the present invention, and suitable for use in a system of the type shown in FIG. 1, are shown in FIG. 2. The subtraction stage constructed in accordance with the principles of the present invention includes an analog-to-digital converter 10 which converts the incoming analog video signal from the television camera 5 into digital signals. The digital signals are first entered into an image memory 11. The subsequent, current video signals, which follow the stored video signals, are subtracted from the stored video signals in a difference-forming stage 12, thereby forming a difference video signal. The difference video signal is supplied to the image reproduction stage. In the embodiment shown in FIG. 2, the image reproduction stage includes a signal converter 13 as an input circuit. This signal converter 13 converts the digital difference video signals supplied by the difference-forming stage 12 into input values. This is undertaken using a conversion factor or conversion function calculated by a computational unit 14. The computational unit 14 is provided with individual parameter adjustment elements 15 and 16, the function of which is described in greater detail below. The video signal converted in this manner is supplied to a digital-to-analog converter 17, wherein it is converted into an analog video signal. This analog video signal is capable of being reproduced on the display 8.

Due to the digitization of the video signal in the analog-to-digital converter 10, the images are in the form of a matrix consisting of a plurality of pixels arranged in columns and rows. Each pixel has a digital value allocated thereto corresponding to the brightness of the image at that point. Subtraction of the values of the mask image, contained in the image memory 11, from the values of the current filled image is undertaken pixel-by-pixel in the difference-forming stage 12. The values of the output signal of the difference-forming stage 12, i.e., the difference video signal, are converted into other digital values pixel-by-pixel in the signal converter 13, these digital values capable of being reproduced on the monitor 8 when converted into analog form. The signal converter 13 may be in the form of a programmable look-up table, or an adding unit and a multiplying unit having a limiter. The computational unit 14 sets the values of the output signals of the signal converter 13 dependent on the setting of the parameter adjustment elements 15 and 16, and thus permits the transmission behavior of the signal converter 13 to be varied.

Figure 3:
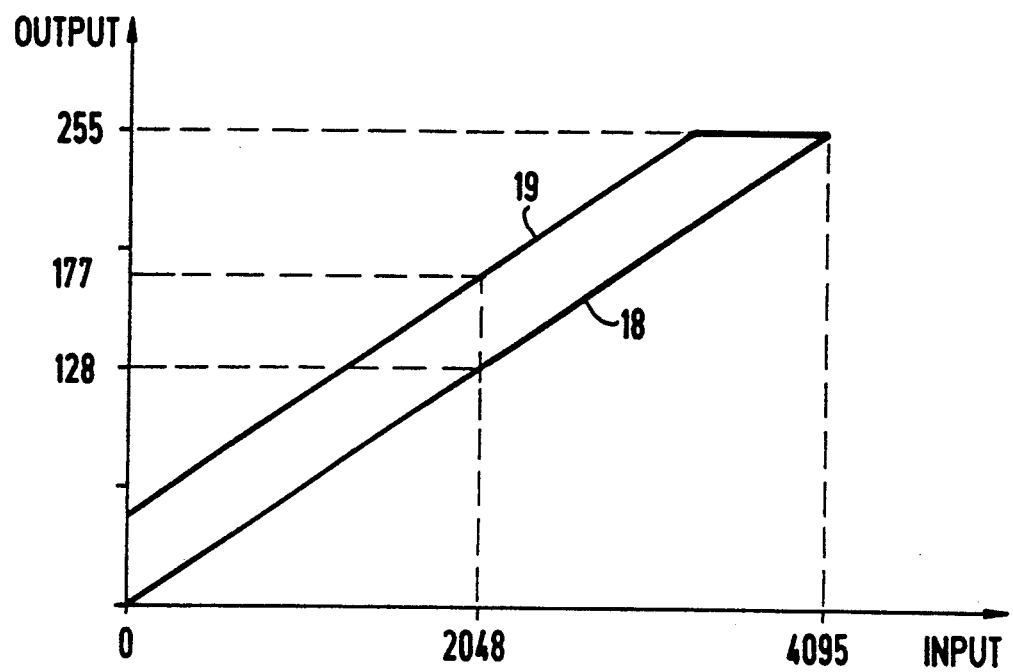
FIGS. 3 and 4 are graphs shown the manner by which the characteristic line for the image can be manipulated in accordance with the principles of the present invention.
Figure 4:
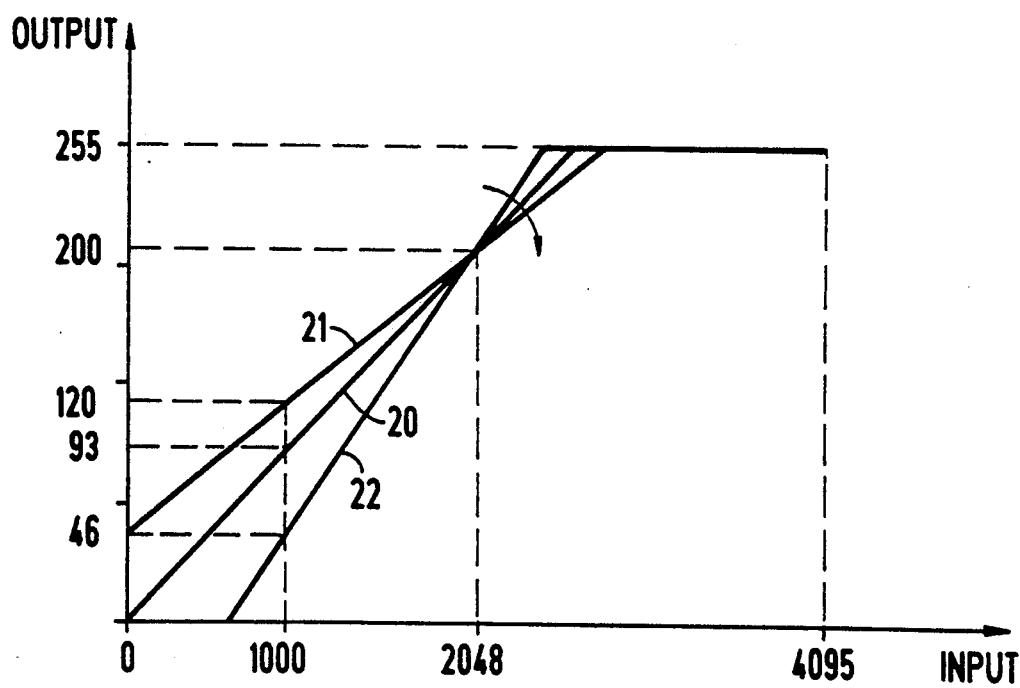

The operation of the signal converter 13 can be described in more detail with reference to FIGS. 3 and 4. In those figures, the output signal OUTPUT of the signal converter 13 is entered on the vertical axis, and the input signal INPUT of the signal converter 13 is shown on the horizontal axis. The input signal can assume $2^{12}$ values between 0 and 4095. Only $2^8$ gray scale values, in the steps 0 through 255, however, can be reproduced on the display 8. The first characteristic line 18 in FIG. 3 thus indicates a linear conversion, wherein all input values are directly allocated to all output values. This is accomplished by extending the straight-line characteristic line 18 through the zero point and through the maximum point. The value at which the difference video signal is zero is referred to as the window middle, and has a digital value of 2048, for which an output value of 128 derives in this embodiment. The value of 128 also lies in the middle.

The background brightness can be set with the parameter adjustment element 15. Operating this adjustment element 15 effects a parallel shift of the characteristic line 18 in the signal converter 13 to, for example, a higher output value, conforming to the characteristic line 19. This means that the contrast remains the same, but the brightness has changed. This also applies to the window middle, having the difference equal to zero, which now has a digital output value of 177.

The darkening or optical density of the blood vessels can be set with the other parameter adjustment element 16. Operation of the adjustment element 16 effects a rotation of the transmission characteristic line, as shown in FIG. 4. The point around which the characteristic line rotates is the intersection of two straight lines: the current transmission characteristic, and a perpendicular line extending from the input value which represents the image signal difference of zero, i.e., the window middle. Dependent on the rotational direction of the adjustment element 16, either a characteristic line 21 having a flatter slope, or a characteristic line 22 having a steeper slope can be obtained by rotating the characteristic line 20. This means that the same output value will be allocated to the digital value of the window middle (difference equal to zero). All other input values will, however, be allocated to different output values as shown, for example, for the input value 1000. In the case of the characteristic line 20, the input value 1000 has an output value of 93 allocated thereto. In the case of the characteristic line 21, a higher output value of 120 is allocated to this same input value 1000, and in the case of the characteristic line 22, a lower output value of 46 allocated thereto. Because all possible transmission characteristic lines proceed through the rotation point, and thus this point remain unchanged when the adjustment element 16 is operated, the background brightness does not change when setting the width of the window.

The arrangement of the invention achieves a window amplifier wherein the transmission characteristic can be altered so that the parameters thereof for reproducing the window on a display can be set independently of each other. Thus, the background brightness can be set by itself using the adjustment element 15, and the darkening or optical density value of the blood vessels can be separately set with the adjustment element 16.

Although modifications and changes may be suggested by those skilled in the art, it is the intention of the inventor to embody within the patent warranted hereon all changes and modifications as reasonably and properly come within the scope of his contribution to the art.

I claim as my invention:

1. An x-ray diagnostics installation for subtraction angiography comprising:

means for generating an x-ray beam for penetrating an examination subject;

means for generating an x-ray image of said examination subject from x-rays in said x-ray beam attenuated by said examination subject;

means for converting said x-ray image into a sequence of video signals;

an image memory for storing a set of said video signals forming an image of said examination subject;

subtraction means for subtracting said set of video signals forming said stored image from a subsequent set of video signals forming a current image of said examination subject, said subtraction means forming difference video signals;

reproduction means for generating a visually displayable image from said difference video signals, including a plurality of individually operable adjustment means for respectively setting parameters of said visually displayable image independently of each other; and said reproduction means including signal converter means for converting said difference video signals into output signals based on straight-line characteristic relationship between the difference video signals and the output signals, with the conversion in said signal converter means controlled by said parameters set by said adjustment means.

2. An x-ray diagnostics installation as claimed in claim 1 wherein said visually displayable image includes a portrayal of blood vessels of said examination subject against a background, and wherein said adjustment means includes means for individually setting the brightness of said background and means for individually setting the darkness of said blood vessels.

3. An x-ray diagnostics installation as claimed in claim 1 wherein said signal converter means is a look-up table.

4. An x-ray diagnostics installation as claimed in claim 1 wherein said adjustment means includes adjustment element means for effecting a parallel shift of said straight-line characteristic.

5. An x-ray diagnostics installation as claimed in claim 1 wherein said adjustment means includes adjustment element means for effecting a rotation of said characteristic straight-line around a point which is the intersection of said straight-line characteristic with a line perpendicular to a difference video signal value representing an image signal difference of zero.

6. An x-ray diagnostics installation for subtraction angiography comprising:

means for generating an x-ray beam for penetrating an examination subject;

means for generating an x-ray image of said subject from x-rays in said x-ray beam attenuated by said examination subject;

means for converting said x-ray image into a sequence of video signals;

image memory for storing a set of said video signals forming an image of said examination subject;

subtraction means for subtracting said set of video signals forming said stored image from a subsequent set of video signals forming a current image of said examination subject, said subtraction means forming difference video signals; and reproduction means for generating a visually displayable image from said difference video signals, including signal converter means for converting said difference video signals into output signals based on a straight-line characteristic relationship between said difference video signals and said output signals, first adjustment element means for effecting a parallel shift of said straight-line characteristic in said signal converter means, and second adjustment element means for effecting a rotation of said straight-line characteristic in said signal converter means around a point which is the intersection of said straight-line characteristic with a perpendicular line from a value of said difference video signals representing an image signal difference of zero, said first and second adjustment element means being independently operable and respectively effecting said parallel shift and said rotation independently of each other.

* * * * *